(12) United States Patent
Iorio et al.

(10) Patent No.: US 9,240,728 B2
(45) Date of Patent: Jan. 19, 2016

(54) CONTROL DEVICE FOR RECTIFIERS OF SWITCHING CONVERTERS

(71) Applicant: DORA S.p.A., Aosta (IT)

(72) Inventors: Alberto Iorio, Aosta (IT); Maurizio Foresta, Aosta (IT); Alberto Bianco, Gressan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 23 days.

(21) Appl. No.: 14/459,159

(22) Filed: Aug. 13, 2014

(65) Prior Publication Data

US 2015/0049522 A1 Feb. 19, 2015

(30) Foreign Application Priority Data

Aug. 14, 2013 (IT) .............................. MI2013A1392

(51) Int. Cl.
*H02M 3/335* (2006.01)
*H02M 3/158* (2006.01)
*H02M 1/00* (2007.01)

(52) U.S. Cl.
CPC ........ *H02M 3/33576* (2013.01); *H02M 3/1588* (2013.01); *H02M 3/33592* (2013.01); *H02M 2001/0058* (2013.01)

(58) Field of Classification Search
CPC ............. H02M 2007/4815; H02M 2001/0058; H02M 3/33507; H02M 1/083; H03K 5/1536
USPC ............... 363/21.02, 21.03, 21.06, 21.14, 89, 363/127; 323/235, 319
See application file for complete search history.

(56) References Cited

U.S. PATENT DOCUMENTS

| 6,396,250 | B1 | 5/2002 | Bridge |  |
|---|---|---|---|---|
| 2010/0103704 | A1 | 4/2010 | Adragna et al. |  |
| 2010/0226150 | A1 | 9/2010 | Thomas et al. |  |
| 2012/0007570 | A1* | 1/2012 | Valenti | H02M 5/2573 323/235 |
| 2013/0194842 | A1* | 8/2013 | Bianco | H02M 1/4225 363/84 |
| 2014/0043865 | A1 | 2/2014 | Choi |  |
| 2014/0300329 | A1* | 10/2014 | Thompson | H03K 5/1536 323/235 |

\* cited by examiner

*Primary Examiner* — Adolf Berhane
*Assistant Examiner* — Alex Torres-Rivera
(74) *Attorney, Agent, or Firm* — Seed IP Law Group PLLC

(57) ABSTRACT

A control device detects zero crossings of a current through a rectifier transistor during plural cycles; generates a turn-on signal of the transistor and inserts a turn-on delay equal to a fixed first quantity from the start time of for each cycle. The control device starts counting consecutive cycles after inserting the turn-on delay; detects whether a zero crossing of the current through the transistor after turning on said transistor has occurred; if no zero crossing is detected before counting a number N of consecutive cycles, decreases the turn-on delay by a fixed second quantity for the next cycle; if a zero crossing is detected, maintains turned on the transistor; if the turn-on delay is smaller than first quantity, increases the turn-on delay o for the next switching cycle; and if the turn-on delay is equal to the first quantity, maintains the turn-on delay for the next switching cycle.

22 Claims, 10 Drawing Sheets

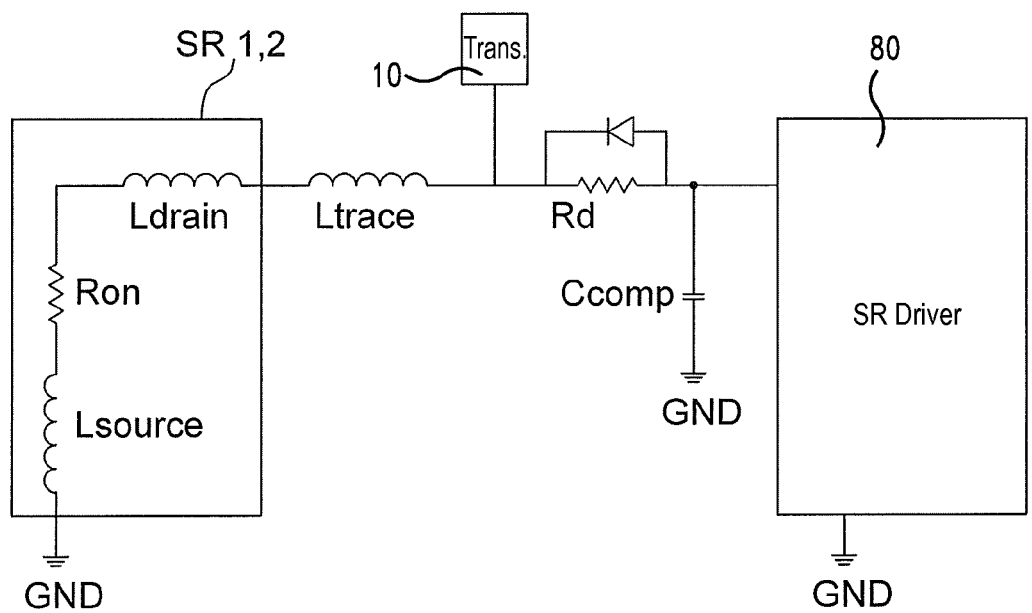
Fig. 4 *(Prior Art)*
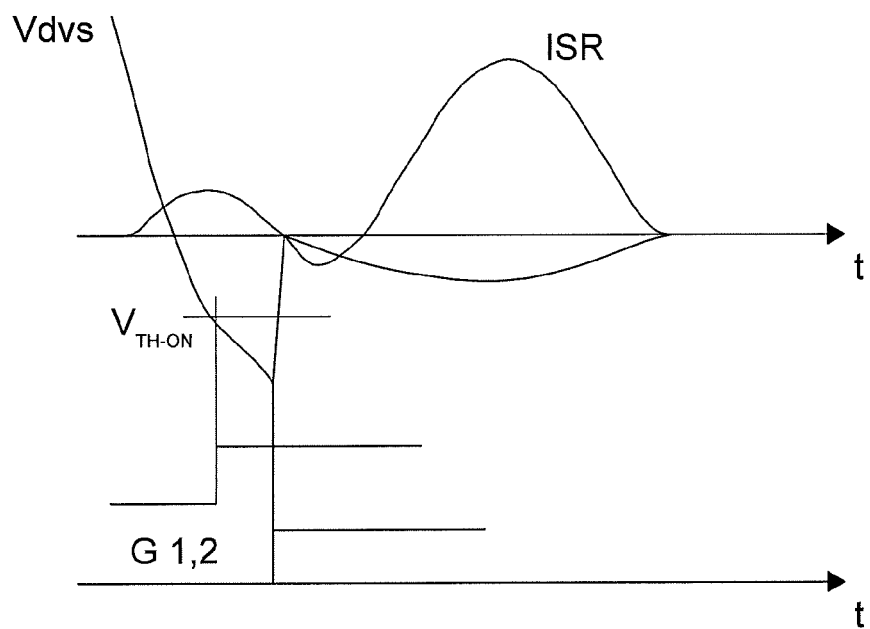
Fig. 5
*(Prior Art)*

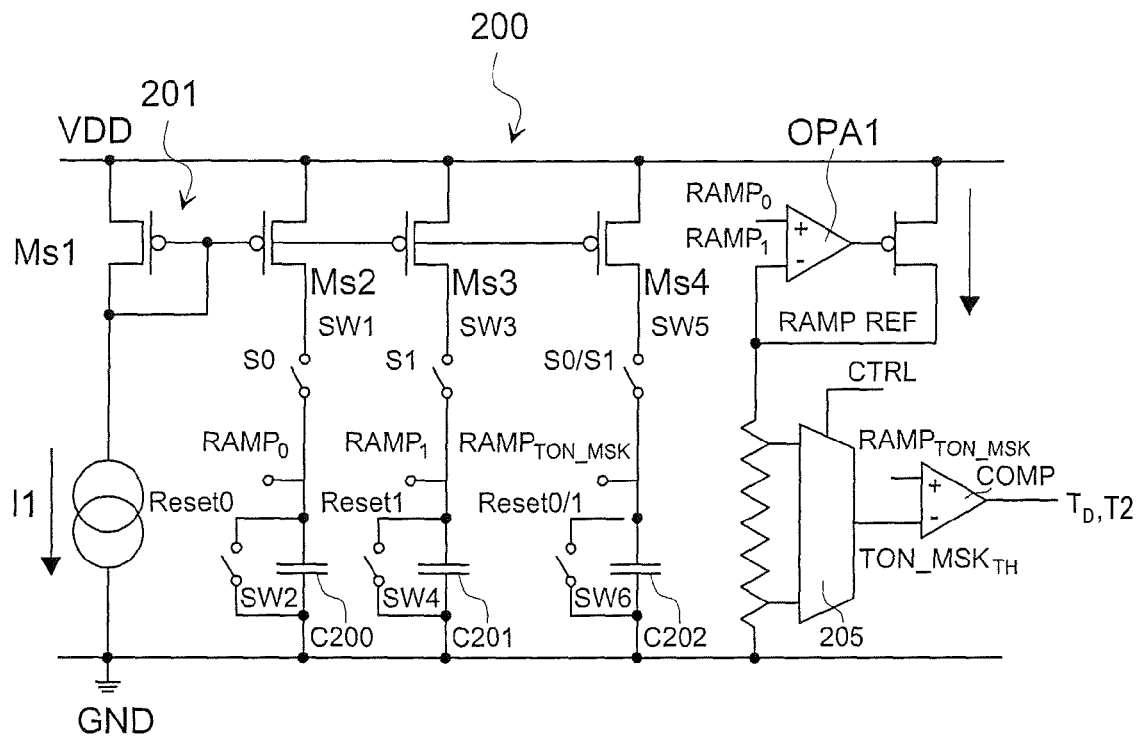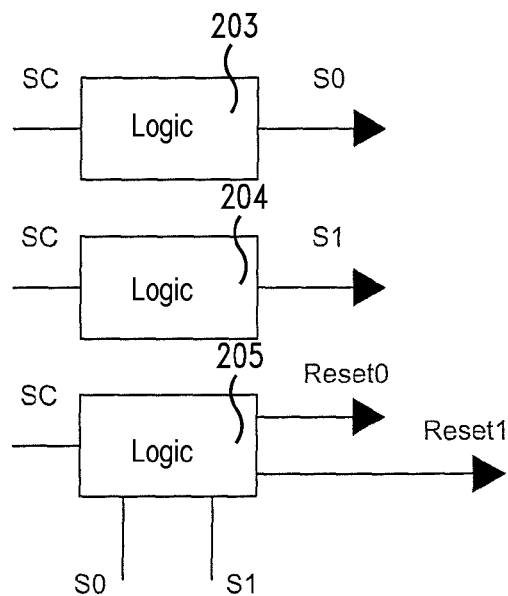
Fig. 10

CONTROL DEVICE FOR RECTIFIERS OF SWITCHING CONVERTERS

BACKGROUND

1. Technical Field

The present disclosure relates to a control device for rectifiers of switching converters.

2. Description of the Related Art

Resonant converters are a large class of forced switching converters characterized by the presence of a half-bridge or a full-bridge circuit. In the half-bridge version, for example, the switching elements comprise a high-side transistor and a low-side transistor connected in series between an input voltage and ground. A square wave having a high value corresponding to the power supply voltage and a low value corresponding to ground may be generated by conveniently switching the two transistors.

The square wave generated by the half-bridge is applied to the primary winding of a transformer by means of a resonant circuit which comprises at least one capacitor and one inductor. The secondary winding of the transformer is connected with a rectifier circuit and a filter to provide an output direct voltage depending on the frequency of the square wave.

At present, one of the resonant converters most widely used is the LLC resonant converter. This name derives from the fact that the resonant circuit employs two inductors (L) and a capacitor (C). A schematic circuit of an LLC resonant converter is shown in FIG. 1 and comprises a half-bridge of MOSFET transistors M1 and M2, with respective body diodes Db1 and Db2, coupled between an input voltage Vin and ground GND and driven by a driver circuit 3. The common terminal between transistors M1 and M2 is connected to a resonant network 2 comprising a series of a first inductance Lr, a second inductance Lm and a capacitor Cr; the inductance Lm is connected in parallel to a transformer 10 comprising a secondary winding connected to the parallel of a capacitor Co and a resistance Rout by means of the rectifier diodes D1 and D2. The output voltage Vo of the resonant converter is the voltage across said parallel, while the output current Io flows through the resistance Rout.

These resonant converters are characterized by a high conversion efficiency (>95% is easily achievable), an ability to work at high frequencies, low generation of EMI (Electro-Magnetic Interference).

In current types of converter circuits, a high conversion efficiency and high power density are desired, as in the case, for example, of the AC-DC adaptors of notebooks. LLC resonant converters are at present the converters that best meet such requirements.

However, the maximum efficiency achievable is limited by the losses in the rectifiers on the secondary side of the converter, which account for over 60% of total losses.

It is known that in order to significantly reduce the losses connected to secondary rectification, recourse can be made to the so-called "synchronous rectification" technique, in which rectifier diodes are replaced by power MOSFETs, with a suitably low on-resistance, such that the voltage drop across it is significantly lower than that across the diode; and they are driven in such a manner as to be functionally equivalent to the diode. This technique is widely adopted in traditional converters, especially in flyback and forward converters, for which there also exist commercially available dedicated integrated control circuits. There is an increasingly pressing desire to adopt this technique in resonant converters as well, in particular in LLC converters, in order to enhance their efficiency as much as possible.

FIG. 2 shows the converter of FIG. 1 in the version with secondary synchronous rectifiers; in this case, in the place of diodes D1 and D2 there are two transistors SR1 and SR2, suitably driven by two signals G1 and G2 deriving from a synchronous rectifier driver 80 and connected between the terminals of the two parts of the center-tapped secondary winding connected to ground GND, while the parallel of Co and Rout is disposed between the center tap of the secondary winding and ground GND. From a functional viewpoint there is no difference, as compared to the schematic in FIG. 1.

The transistors SR1 and SR2 have respective body diodes Dbr1 and Dbr2, and are both are driven by the synchronous rectifier driver 80. The output voltage Vo of the resonant converter is the voltage across said parallel, while the output current Io flows through the resistance Rout.

In operation, the transistors SR1 and SR2 are driven in such a manner to be alternatively turned-on at a certain frequency by the synchronous rectifier driver 80. When the body diode Dbr1, Dbr2 of one of the transistors SR1, SR2 starts conducting the relative transistor is turned-on, while when the current is approaching to zero the transistor is turned-off; in this way the use of the transistors SR1, SR2 causes a lower voltage drop than the use of the diodes D1, D2 and the power dissipation is reduced.

Particularly, as is shown in FIG. 3, a phase A is activated when the voltage Vdvs between the drain and source terminals of one of the transistor SR1, SR2, for example SR1, is lower than a voltage value of 0.7V and the relative body diode Dbr1 starts conducting; then when the voltage Vdvs falls under a turn-on threshold voltage $V_{TH\_ON}$ and after a fixed delay time period $T_{PD\_ON}$, when the voltage Vdvs is maintained under the turn-on threshold voltage $V_{TH\_ON}$, the transistor SR1 is turned-on from the driver.

After the turn on of the transistor SR1, in a phase B, the voltage Vdvs has a value of Vdvs=−Rdson×Isr, wherein Rdson is the on resistance of the transistor SR1, SR2 and Isr is the current flowing through the electric path between the center-tap CT of the secondary winding of the transformer and ground GND.

When the voltage Vdvs has a value higher than a second threshold voltage $V_{TH\text{-}OFF}$, the transistor SR1 is turned off by the driver 4. The respective body diode Dbr1 conducts again and the voltage Vdvs goes negative; when the voltage Vdvs reaches the value of 1.4V, the drive circuit relative to the transistor SR2 is enabled.

However, the voltage Vdvs depends on parasitic elements of the source and drain terminal of the transistor SR1, SR2 and of the path of printed circuit board (PCB) from the drain terminal of the transistor SR1, SR2 and the terminal of the secondary winding. Particularly, the voltage Vdvs depends on the parasitic inductances Lsource and Ldrain associated to the source and drain terminal of the transistor SR1, SR2 and on the parasitic inductance Ltrace relative to the path of printed circuit board (PCB) from the drain terminal of the transistor SR1, SR2 and the terminal of the secondary winding, therefore $$Vdsv = -Rdson \times Isr - (Ldrain + Lsource + Ltrace) \times \frac{\partial Isr}{\partial t},$$

that is the parasitic inductances make the sensed voltage Vdvs different from the ideal voltage drop value on Rdson.

The presence of the parasitic inductances Ldrain, Lsource and Ltrace determines an undesired earlier turn-off of the transistors SR1, SR2.

A known technique to avoid the earlier turn-off of the transistors SR1, SR2 is to compensate the time anticipation due to the parasitic inductances by adding an RC filter downstream the rectifier driver and before the transformer. The RC filter comprises an external capacitor Ccomp and a tunable resistor Rd. Current inversion has to be avoided to prevent converter malfunctions and failure.

The RC compensation of the parasitic inductances Ldrain, Lsource and Ltrace may cause a delay to turn on the transistors SR1, SR2; a bypass diode arranged in parallel to the resistor Rd eliminates this turn-on time delay, as shown in FIG. 4. Furthermore, a resistor, of the value of about 100-200Ω, arranged in series to the bypass diode is typically used to limit current out of the drain terminal of the transistors SR1, SR2, in the case wherein the voltage Vdvs goes excessively under ground GND.

This solution has the advantages of providing a simple architecture with a consequent low cost in term of Silicon area and good performance.

However, external components are needed to optimize efficiency. Furthermore, during the transition of the drain voltage of each MOSFET transistor SR1,SR2 the secondary side current $I_{SR}$ is strongly affected from parasitic elements of the MOSFET transistor as the gate-drain capacitance Cgd. In this condition a peak of current $I_{SR}$ depending on the load is present at the beginning of each switching semi-cycle. In this condition the voltage Vdvs at the drain terminal of transistor SR1, SR2 could reach the turn-on threshold voltage $V_{TH\_ON}$, and after the fixed delay time period $T_{PD\_ON}$, the driver 80 could turn on the transistor SR1, SR2 causing an inversion of the current flowing through the transistor SR1, SR2 and consequently malfunction and even failure of the converter, as shown in FIG. 5.

BRIEF SUMMARY

One aspect of the present disclosure is to provide a control device for a rectifier of a switching converter which avoids the inversion of the current flowing through a transistor of the rectifier. Also the control device increases the efficiency of the switching converter.

One aspect of the present disclosure is a control device for a rectifier of a switching converter, the rectifier comprising at least one transistor, the control device comprising a detecting circuit to detect a zero cross event of the current flowing through the at least one transistor during each converter switching half-cycle, the control device being configured to generate a turn-on signal of the at least one transistor and to insert a turn-on delay of the turn-on signal of the at least one transistor equal to a first fixed quantity from the start time instant of converter switching half-cycle for each switching cycle, wherein the control device comprises a counter for counting consecutive converter switching cycles to a given number N, the control device being configured to:

start the counter after the insertion of the turn-on delay of the turn-on signal, verify cycle for cycle the detection or no of a zero cross event of the current flowing through the at least one transistor after the turn-on of said at least one transistor, and if no zero cross event of the current flowing through the at least one transistor is detected before said given number N of consecutive switching cycles is counted by the counter, decrease the turn-on delay of a second fixed quantity for the next switching cycles, reset and restart the counter, or if a zero cross event of the current flowing through the at least one transistor is detected, maintain turned on said at least one transistor, reset and restart the counter, and if the turn-on delay of the turn-on signal is smaller than the first fixed quantity, increase the turn-on delay of the second fixed quantity for the switching cycles following the one in which zero cross event is detected, or if the turn-on delay of the turn-on signal is equal to said first fixed quantity, maintain the turn-on delay for the switching cycles following the one in which zero cross event is detected.

Another aspect of the present disclosure is a method of controlling a rectifier of a switching converter, the rectifier comprising at least one transistor, the method comprising:

generating a turn-on signal of the at least one transistor, inserting a first turn-on delay of the turn-on signal of the at least one transistor equal to a first fixed quantity from the start time instant of converter switching half-cycle for each switching cycle;

starting a count of a given number N of consecutive converter switching cycles, verifying cycle for cycle the detection or no of a zero cross event of the current flowing through the at least one transistor after the turn-on of said at least one transistor, and if no zero cross event of the current flowing through the at least one transistor is detected until the given number N of consecutive switching cycles is counted, decreasing the first turn-on delay of a second fixed quantity for the next switching cycles, resetting the count and restarting the count of said given number of consecutive switching cycles or, if a zero cross event of the current flowing through the at least one transistor is detected, maintaining turned on said at least one transistor, resetting and restarting the counting of said number N of consecutive switching cycles, and if the turn-on delay of the turn-on signal is smaller than first fixed quantity, increasing the turn-on delay of the second fixed quantity for the switching cycles following the one in which zero cross event is detected, or if the turn-on delay of the turn-on signal is equal to said first fixed quantity, maintaining the turn-on delay for the switching cycles following the one in which zero cross event is detected.

BRIEF DESCRIPTION OF THE SEVERAL VIEWS OF THE DRAWINGS

For a better understanding of the present disclosure, a preferred embodiment thereof is now described, purely by way of non-limiting example and with reference to the annexed drawings, wherein:

FIG. 4 shows a transistor of the rectifiers of FIG. 2 with the parasitic elements, an RC compensation filter and a bypass diode;

FIG. 5 shows the waveforms of the current flowing through a transistor of the rectifier in FIG. 2 with a current inversion due to a premature turning on of the transistor;

FIG. 10 shows a possible implementation of a part of the control circuit in FIG. 6;

DETAILED DESCRIPTION

Figure 1:
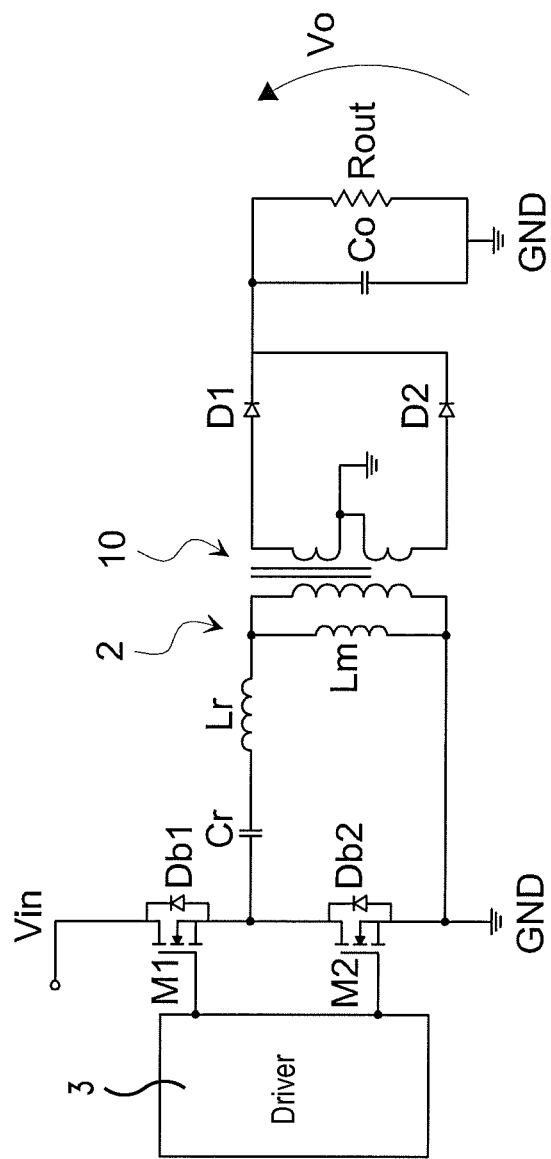
FIG. 1 is a diagram of an LLC-type resonant converter with a center-tapped secondary winding and rectification of the output current by means of diodes according to prior art.
Figure 2:
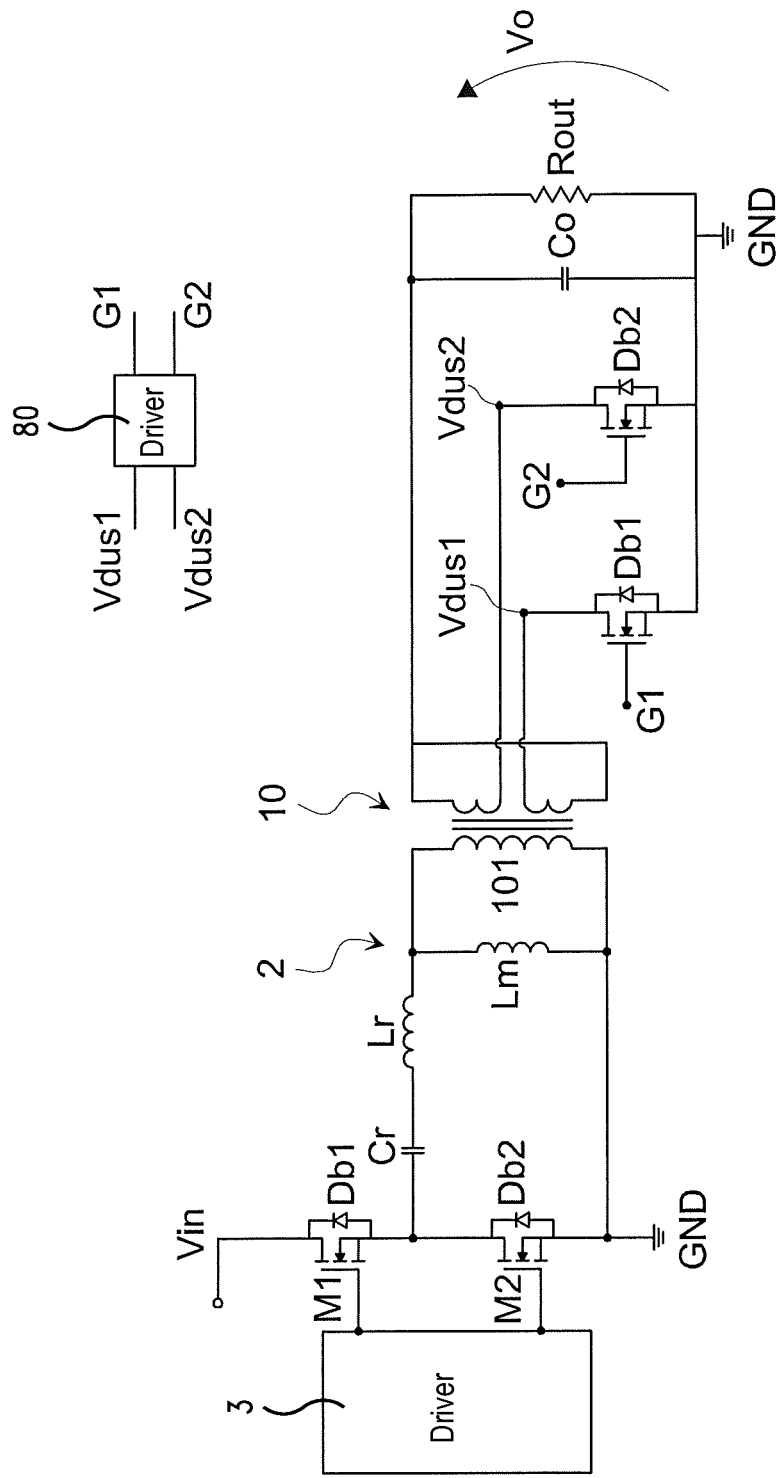
FIG. 2 is a diagram of an LLC-type resonant converter with a center-tapped secondary winding and rectification of the output current by means of synchronous rectifier according to prior art.
Figure 3:
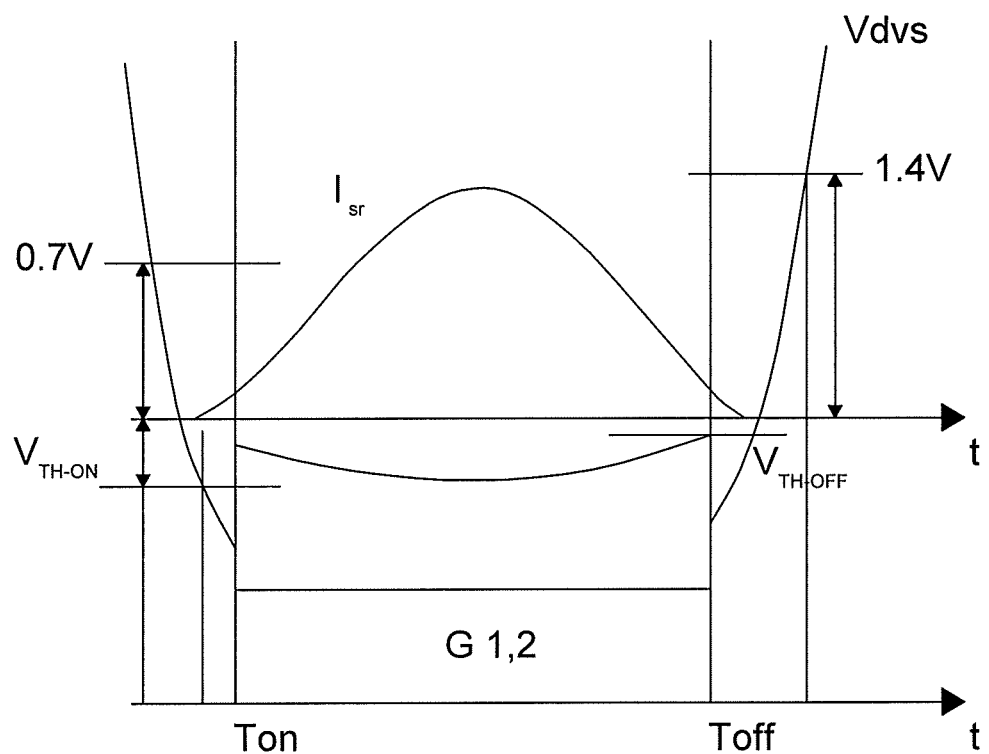
FIG. 3 shows the waveforms of the current flowing through a transistor of the rectifiers of FIG. 2 and of its drain source voltage.
Figure 6:
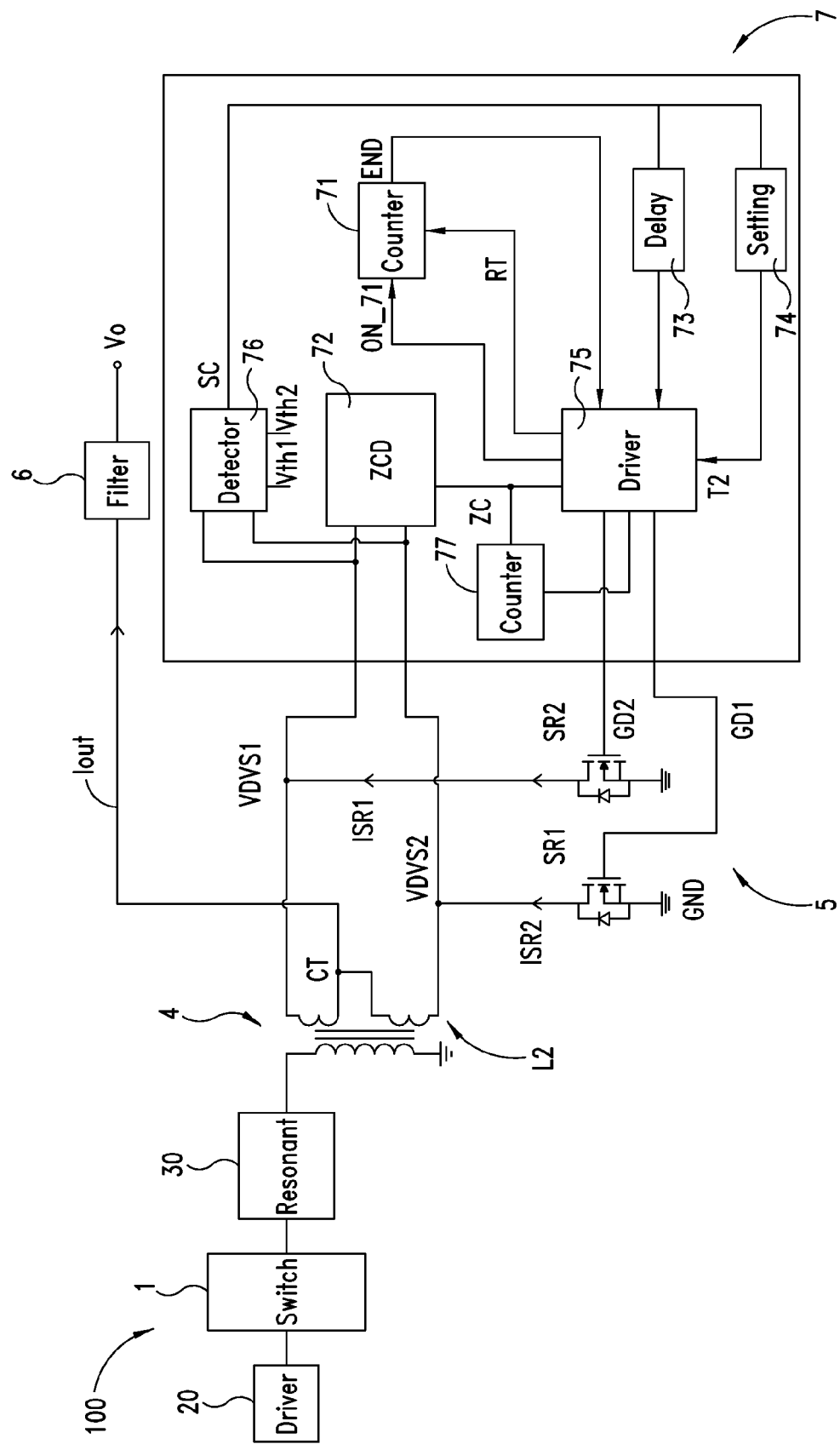
FIG. 6 is a block diagram of a switching converter comprising a control device for a rectifier according to the present disclosure.

A control device for a rectifier of a switching converter according to the present disclosure is shown in FIG. 6. The switching converter 100 comprises a power switching circuit block 1, which is powered by DC voltage and configured to generate a square wave with a certain frequency under the drive given by a first driver 20. For example, the power switching circuit block 1 could be a half-bridge or a full-bridge circuit (typically of MOSFET transistors) but other power switching circuit blocks could be equally adopted. The switching converter 100 comprises an impedance 30 connected to the primary winding of a transformer 4; the converter is adapted to provide an output current.

Preferably the switching converter 100 is an LLC resonant converter and the impedance 30 is a resonant circuit. The square wave generated by the power switching circuital block 1 is applied to the resonant circuit 30 tuned to the fundamental frequency of the square wave. In this, manner, because of its selective characteristics, the resonant circuit 30 responds principally to this fundamental component and to a negligible degree to higher-order harmonics. It follows that the circulating power can be modulated by varying the frequency of the square wave, while maintaining the duty cycle constant at 50%, and that, according to the configuration of the resonant circuit 30, the currents and/or voltages associated with the power flow will have a pattern that is sinusoidal or sinusoidal at intervals.

Said resonant circuit 30 is coupled to the transformer 4, comprising primary and secondary windings, which provides output current flow of the switching converter 100.

A rectifier 5 comprising at least one transistor SR1, SR2 is coupled to the center-tapped secondary winding L2 of the transformer 4. Preferably the rectifier 5 comprises a pair of transistors SR1 and SR2 which have drain terminals connected with respective terminals of two portions of the center-tapped secondary winding L2 and source terminals connected with ground reference GND. The center-tap CT of the secondary winding L2 is then connected to a filter 6 which provides the output current Iout and the output voltage Vo. Said filter could be a common parallel of a capacitor and a resistance.

Said two transistors SR1, SR2 are preferably two MOSFET transistors with respective body diodes Dbr1, Dbr2 and a suitably low on-resistance Ron, such that the drain-source voltage drop across it is significantly low if compared to the voltage drop across a diode, like in prior art rectifier configurations.

A control device 7 drives the rectifier 5; preferably the control device 7 drives synchronously said transistors pair SR1 and SR2 by means of two signals GD1 and GD2, applied to the control terminals of the transistor SR1 and SR2, respectively. Said control device 7 comprising at least one zero crossing detector (ZCD) 72 configured to detect the zero crossings ZC of the currents ISR1, ISR2 flowing through the transistors SR1, SR2.

The control device 7 has as its input parameters the currents ISR1, ISR2 (or equally, the drain-source voltages Vdvs1 and Vdvs2) of the power MOSFETs SR1, SR2, and has as output parameters the two control signals GD1, GD2, respectively for the transistors SR1, SR2. A set of further signals and other temporal parameters which are used by control device 7 are described below.

Figure 7:
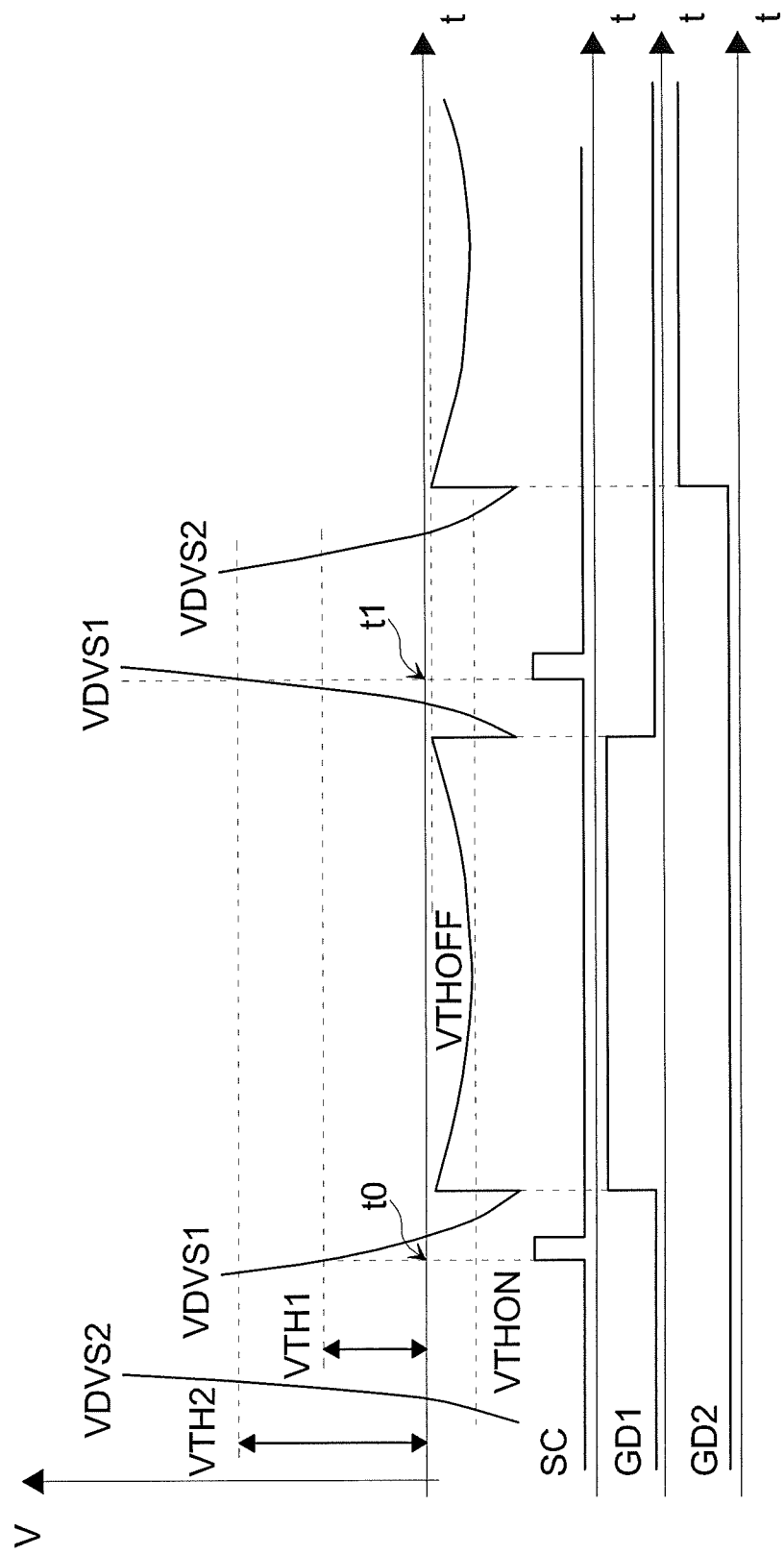
FIG. 7 is a time diagram of the waveforms of the drain-source voltages of the transistors of a synchronous rectifier of prior art and of the waveforms of the current flowing through the transistors.

The drain-source voltages Vdvs1, Vdvs2 and the currents ISR1, SR2 of the MOSFET transistors SR1 and SR2 have a temporal trend as shown in FIG. 7. Each switching cycle of the converter 100 comprises alternately turning on and off the transistors SR1, SR2; therefore each switching half-cycle SC of the converter 100 involves alternately one of the two transistors of the pair SR1, SR2, and in particular each half-cycle SC begins when the drain-source voltage Vdvs1 or Vdvs2 is equal to a threshold value Vth1 of preferably 0.7V and ends when the same drain voltage Vdvs1 or Vdvs2 reaches a threshold value Vth2 preferably of 1.4V. For example, in an application with a converter switching frequencies of 100 KHz the half-cycle SC is equal to 5 microseconds.

The control device 7 comprises therefore a switching detector circuit 76 capable of detecting the start and end of each switching half-cycle SC (and of measuring the length thereof). The switching detector circuit 76 preferably includes a comparator circuit configured to detect the start and end of each half-cycle by comparing the voltages Vdvs1 or Vdvs2 with the voltage thresholds Vth1, Vth2, where Vth2 is higher than Vth1 and outputting a pulse signal SC when the drain-source voltage Vdvs1 or Vdvs2 is equal to the threshold value Vth1 and when the same drain voltage Vdvs1 or Vdvs2 reaches the threshold value Vth2.

The transistors SR1, SR2 are driven by the control device 7 in such a manner to be alternately turned-on within the relative half-cycle SC by means of the two control signals GD1, GD2, and in particular when the body diode Dbr1, Dbr2 of one of the transistors SR1, SR2 starts conducting the relative transistor is turned-on, while when the current ISR1, ISR2 is approaching to zero the transistor SR1, SR2 is turned-off.

The zero crossing detector 72 of the control device 7 detects alternately a zero crossing ZC of the current ISR1, ISR2 flowing through the transistors SR1, SR2, per switching half-cycle SC. Considering a single half-cycle SC, particularly a half-cycle SC wherein the transistor SR1 is turned on, $t_0$ is the start time instant of the half-cycle SC (which correspond to the instant in which the voltage Vdvs1 is equal to 0.7V) and $t_1$ is the end time instant of the half-cycle SC in which Vdvs1 is equal to 1.4V).

Starting from the instant $t_0$, the driving circuit 75 of the control device 7 according to the present disclosure is configured to insert a turn-on delay time $T_D$ in the turn-on signal GD1 of the MOSFET transistor SR1 equal to a first fixed quantity $T_{D\_ON}$. The first fixed quantity $T_{D\_ON}$ is generated by a delay setting circuit 73 inside the control device 7 while the turn-on signal GD1 is generated by the driving circuit 75 belonging to the control device 7

The turn-on delay $T_{D\_ON}$ represents a maximum turn-on delay of the turn-on signal GD1 of the MOSFET transistor SR1. The turn-on delay $T_{D\_ON}$ is chosen in such a way to temporally overtake eventual current peaks of the current ISR1 at the start of the half-cycle SC; current peaks of the current ISR1 occur typically in low or medium load of the switching converter 100 and could cause a premature turn-on of the MOSFET transistor SR1.

Preferably the fixed quantity $T_{D\_ON}$ is equal to 30% of half-cycle SC; in this case the transistor SR1 turns on after 1.5 micro seconds from the time instant $t_0$.

The delay setting circuit 73 is configured to measure the duration of the switching half-cycle by means of the pulses SC at its inputs and to determine a duration of the first fixed quantity $T_{D\_ON}$. The duration of each half-cycle, like every other time interval of interest (e.g., duration of the rectifier conduction period or of a certain fraction of the half-cycle), can be measured using any technique of the known art, for example using analog ramps that are reset at the arrival of one pulse SC and released at the arrival of the next pulse SC. Other percentages of the half-cycle SC could be equally chosen as first fixed quantity $T_{D\_ON}$ in order to bypass the risk of an undesired premature turn-off time.

Figure 8A:
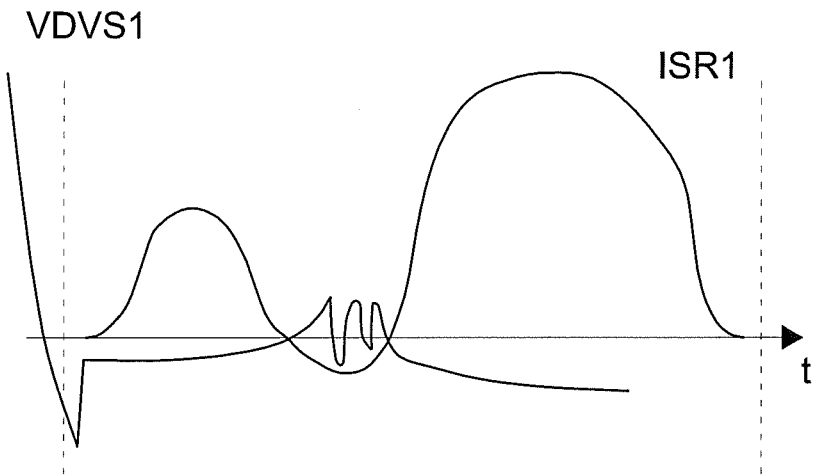
FIG. 8a-8b are time diagrams of a first and a second typical waveforms of the currents flowing through the transistor of the synchronous rectifier.
Figure 8B:
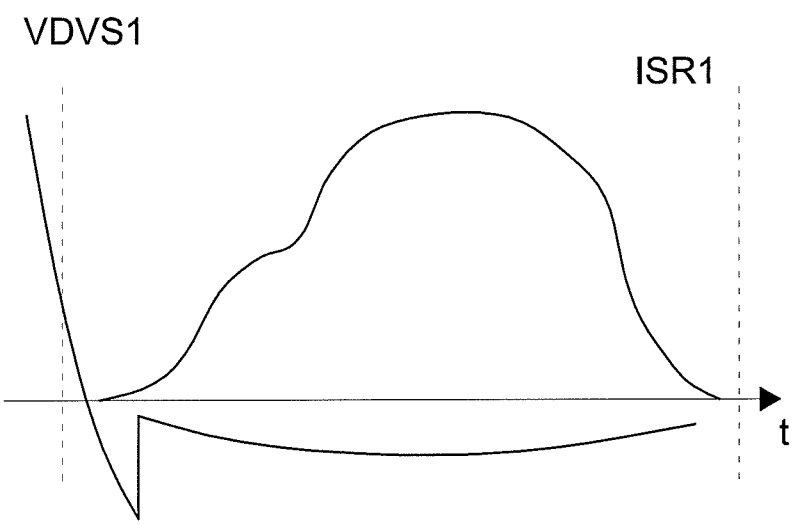
Figure 9:
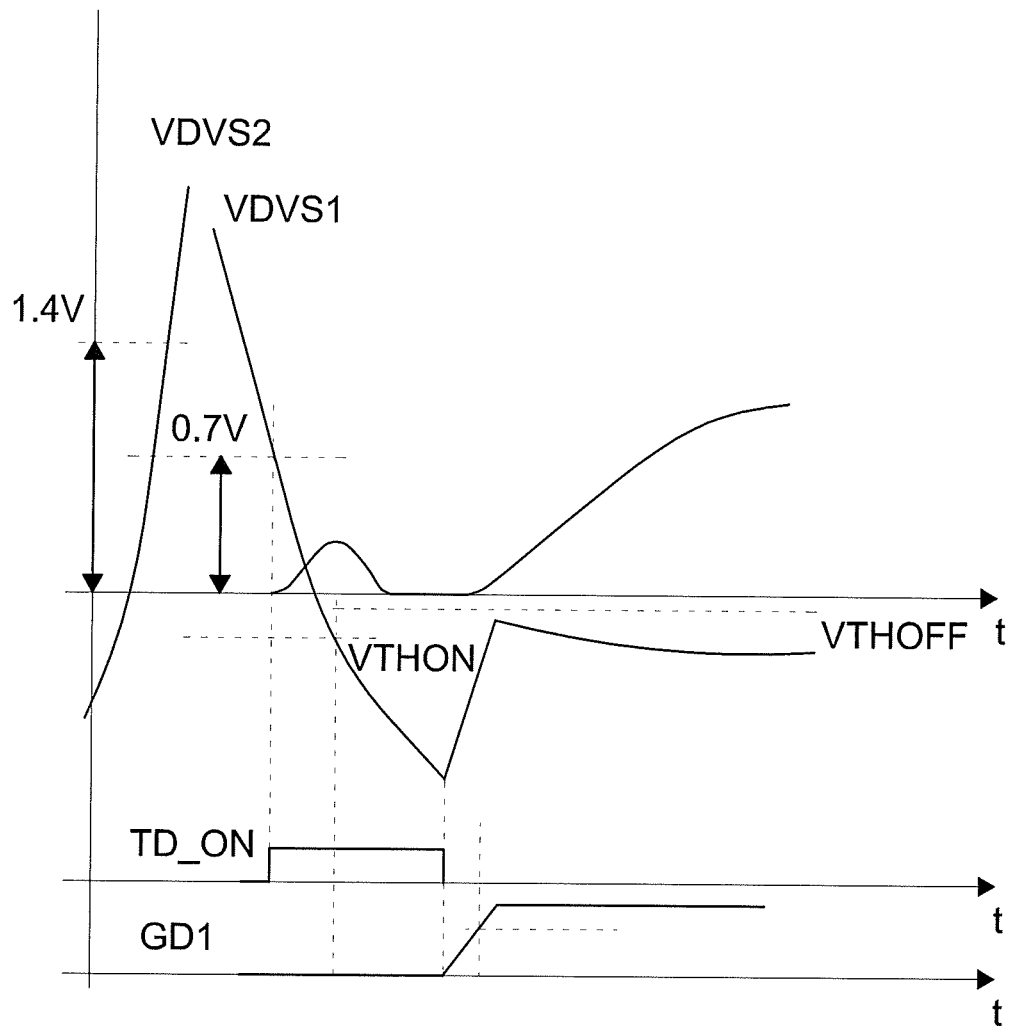
FIG. 9 shows the waveforms of signals in play in the control device and the rectifier of FIG. 6.

As is shown in FIGS. 8a, 8b, two typical waveforms of the current ISR1 may occur, particularly in the case of a low or medium load of the switching converter (the waveform of FIG. 8a) or in the case of a high load of the switching converter (the waveform of FIG. 8b). In the first case, the current ISR1 is affected by a easily distinguishable current peak followed by an absorption part mainly due to the parasitic gate-source capacitance Cgs of the MOSFET SR1. By choosing a first turn-on delay $T_{D\_ON}$ of 30% of the half-cycle SC, an undesired current inversion of the current ISR1 is avoided. In spite of this there is a lower conversion efficiency, but it is only an initial loss which is preferable to a current inversion.

In the second case (the waveform of FIG. 8b), the current peak is incorporated into the current curve so that no current inversion occurs and there is only an initial efficiency loss.

The control device 7 comprises a counter 71 which is activated, by means of a signal ON-71 output from the driving circuit 75, after the insertion of said turn-on delay $T_{D\_ON}$ in the turn-on signal GD1 of the transistor SR1 in the first switching cycle of the transistor SR1; the counter 71 counts consecutive switching cycles to a number N, wherein the number N is an integer number and is chosen on the basis of the given application to reduce initial efficiency loss, preferably it is equal to 128.

The control device 7 verifies cycle by cycle the detection or no of a zero crossing ZC of the current ISR1 flowing through the transistor SR1 after the turn-on of the transistor SR1.

If no zero crossing ZC of the current ISR1 is detected from the circuit 72, the driving circuit 75 will insert the turn-on delay $T_{D\_ON}$ in the turn-on signal GD1 of the transistor SR1 for each successive switching cycle SW to the number N=128 of consecutive switching cycles SW counted by the counter 71. When the counter 71 counts the number N, the counter 71 sends a signal END to the driving circuit 75 which provides to decrease the turn-on delay $T_D$ for the next switching cycle by a second fixed quantity T2 generated by a second delay setting circuit 74 inside the control device 7 (therefore the delay time $T_D=T_{D\_ON}-T2$), resets the counter 71 by means of the signal Rt and sends the signal ON-71 to the counter 71 which is enabled to count for other 128 consecutive switching cycles SW. Said second fixed quantity T2 is a percentage (preferably 1-2%) of the half-cycle SC which depends on the given application and in this case, for example, is equal to 100 nanoseconds. The second delay setting circuit 74 is configured to measure the duration of the switching half-cycle by means of the pulses SC at its inputs and to determine a duration of the second fixed quantity T2.

Otherwise, if a zero crossing ZC of the current ISR1 is detected by the circuit 72 before the N consecutive switching cycles are counted by the counter 71, when the turn-on delay $T_D$ of the turn-on signal GD1 of the transistor SR1 is equal to the first fixed quantity $T_{D\_ON}$, the driving circuit 75 provides to maintain turned on said transistor and the turn-on delay $T_{D\_ON}$ for the switching cycles following the one in which zero crossing event is detected and provides to reset and restart the counter 71.

For each successive switching cycle in the case wherein a zero cross event ZC of the current ISR1 is detected by the circuit 72, the driving circuit 75 provides to increase the turn-on delay $T_D$ of the turn-on signal GD1 by the second fixed quantity T2 if the turn-on delay $T_D$ is smaller than the first fixed quantity $T_{D\_ON}$ or to maintain the turn-on delay $T_D$ if $T_D=T_{D\_ON}$ for the switching cycles following the one in which a zero crossing has been detected; the driving circuit 75 also maintains turned on said transistor, sends a reset signal Rt to the counter 71 which enables the same counter to count for other 128 consecutive switching cycles by means of the signal ON-71.

Therefore the counter 71, when a zero crossing ZC of the current ISR1 is detected by the ZCD circuit 72 or when the counting arrives to the number N, is reset and is re-enabled to count the number N of consecutive switching cycles.

The control device 7 comprises another counter 77 configured to count the consecutives zero crossings ZC detected by the circuit 72 to a number K when the turn on delay time $T_D=T_{D\_ON}$. In fact the control device 7, if the counter 77 gets to count the number K with $T_D=T_{D\_ON}$, enters into a sleep mode status by the driver 75 turning off both the transistors SR1 and SR2.

The control device 7 continues in operation like above described, inserting a turn-on masking time delay which is maintained/increased or decreased if a zero crossing ZC of the current ISR1 occurs or no zero crossing ZC occurs after 128 consecutive semi-cycles SC, respectively. In the case of a waveform of the current ISR1 as in FIG. 8b, the operation of the control device finishes when a certain minimum turn-on time delay $T_{D\_ONmin}$ is reached. In this case, in order to maximize the efficiency of the switching converter, said minimum turn-on time delay is preferably chosen equal to 50 nanoseconds.

In the case of a waveform of the current ISR1 as in FIG. 8a, the turn-on of the MOSFET transistor SR1 will fluctuate around the optimal time instant and the control device 7 remain operative.

The driving circuit 7 according to the present disclosure controls the transistor SR2 in the same way as the transistor SR1, that is all the operations carried out for the transistor SR2 are carried out for the transistor SR2 in the other half-cycle of each switching cycle SW. Preferably the same turn-on delays are used for controlling the transistors SR1 and SR2.

Preferably the control device 7 comprises two control sections dedicated for each transistor, one section to control the transistor SR1 and another section for controlling the transistor SR2. Preferably the same turn-on time delays are used for both the sections of the control device 7 used for controlling the transistors SR1 and SR2 by means of two signals GD1 and GD2. The information for the actual section influences the turn-on delay used for the turn-on of the other section. In this way the section that has a lower conduction time increases the turn-on delay causing also that the following section drives less current (it is switched on with a delay dependent on other section respect of its desired turn-on masking).

FIG. 10 shows a possible implementation of the delay setting circuits 73, 74 which include a switching circuit 200 comprising a mirror circuit 201 that includes a PMOS transistors Ms1-Ms4 having respective control terminals coupled to each other. The mirror circuit 201 is configured to mirror a current I1 of a current generator of a first circuit leg into three circuit legs. Each of the three circuit legs includes a PMOS transistor Ms2, Ms3, Ms4; a capacitor C200-C202; a switch SW1, SW3, SW5 coupled between the transistor Ms2-Ms4 and a terminal of the capacitor C200-C202 having the other terminal connected to ground GND and another switch SW2, SW4, SW6 connected in parallel to the capacitor C200-C202. The switches SW1, SW3, SW5 are driven by the signals S0, S1, S0/S1 and the switches SW2, SW4, SW6 are driven by the signals Reset0, Reset1, Reset0/Reset1.

The signals S0 and S1 are provided by the respective logic circuits 203, 204 having at the input the pulse signal SC representative of the start of a half-cycle. The signals S0 and S1 rise to the high logic level at the falling edge of the pulse signal SC and fall to the low logic level at the rising edge of the pulse signal SC. The signals S0 and S1 are at the high logic level respectively during the first half cycle of each switching cycle SW of the converter and during the second half cycle of each switching cycle SW of the converter. The signals Reset0 and Reset1 are provided by another logic circuit 205 having at the inputs the signals SC, S0 and S1.

Figure 11A:
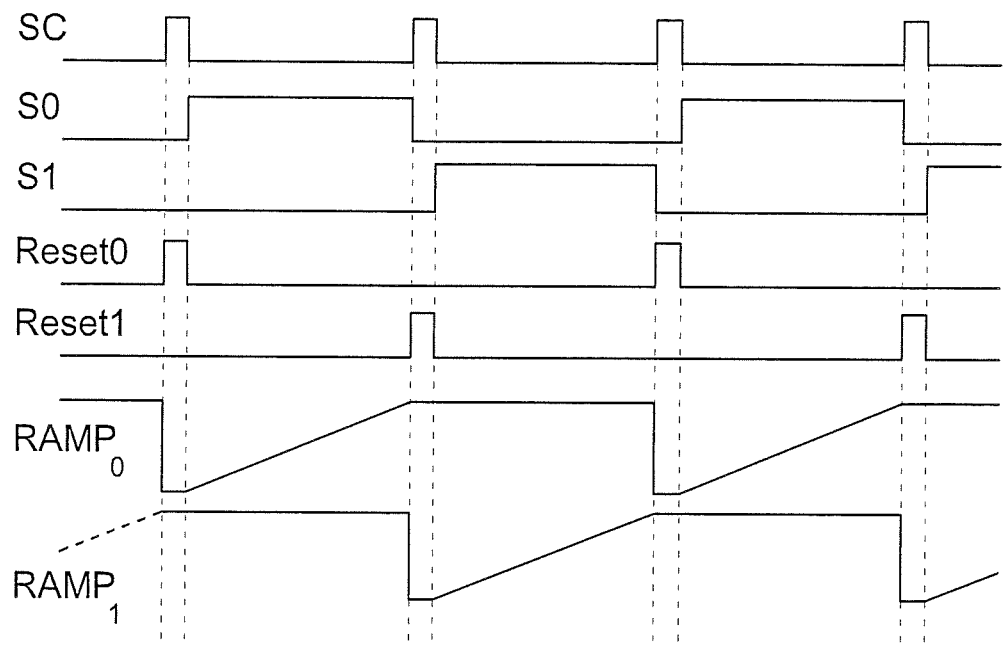
FIGS. 11a-11b show the waveforms of signals in play in the circuit of FIG. 10.

The circuit 200 is configured to generate a voltage ramp $RAMP_0$ by means of the drive signal S0 (FIG. 11a) driving the switch SW1 and of the reset signal reset0 driving the switch SW2. Particularly, when the switch SW1 is closed (while the second switch SW2 is opened) the capacitor C200 is charged by the current I1 provided by a current-mirror 201 and the voltage ramp $RAMP_0$ rises to the maximum value in one half-cycle; the switch S0 is opened and the voltage ramp $RAMP_0$ remains at the maximum value for the next half-cycle and falls to ground GND at the arrive of the reset signal Reset0 which closes the switch SW2 (FIG. 11a).

In the same way a second voltage ramp $RAMP_1$ is generated by means of a second drive signal S1 and the reset signal Reset1. Particularly, when the switch SW3 is closed (while the second switch SW4 is opened) the capacitor C201 is charged by the current I1 provided by a current-mirror 201 and the voltage ramp $RAMP_1$ rises to the maximum value in one half-cycle; the switch S0 is opened and the voltage ramp $RAMP_1$ remains at the maximum value for the next half-cycle and falls to ground GND at the arrival of the reset signal Reset1 which closes the switch SW4.

Furthermore, a saw tooth signal $RAMP_{TON\_MSK}$, given by the sum of the first $RAMP_0$ and the second $RAMP_1$ voltages, is provided by the switching circuit 200 through the capacitor 202 and the switches SW5, SW6.

The first voltage ramp $RAMP_0$ and a second voltage ramp $RAMP_1$ are both provided at the non-inverting input of an operational amplifier OPA1 that selects which of the two signals has the higher value. The operational amplifier OPA1 has a negative feedback, as shown in FIG. 11, and it is used to generate a full scale ramp voltage value RAMP REF at the input of a DAC 206. Every switching half-cycle SC the signal $RAMP_{TON\_MSK}$ is compared by means of a comparator COMP with a variable threshold $TON\_MSK_{TH}$ which is a percentage of full scale ramp voltage value RAMP REF depending of a signal CTRL provided by the control device 7; the signal CTRL depends on the detection or not of a zero cross event ZC of the current ISR1 and at the output of the comparator COMP there is the turn-on delay $T_D$. In particular, the full scale voltage value RAMP REF is digitally partitioned in a plurality of voltage threshold values $TON\_MSK_{TH}$ (for ex. 2%, 4%, . . . , 30% of RAMP REF) each one identified by a n-bit word; one voltage threshold value $TON\_MSK_{TH}$ selected by the control signal CTRL is then provided at the output of the DAC converter. The voltage threshold value $TON\_MSK_{TH}$ is decreased when no zero cross event ZC of the current ISR1, ISR2 is detected for N consecutive switching cycles while it is increased when a zero cross event ZC is detected or maintained when the $TON\_MSK_{TH}$ is at the maximum value.

Figure 11B:
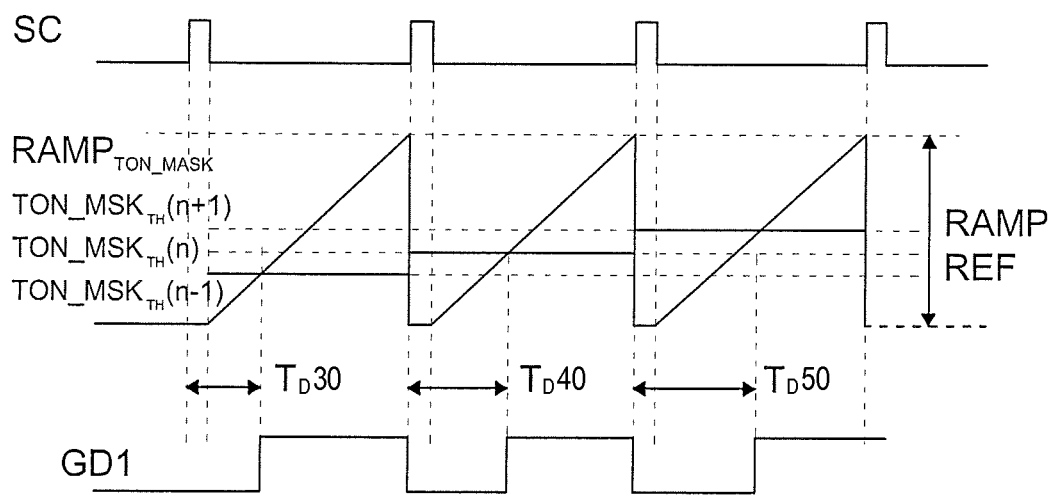

Since the RAMP REF depends of the voltage ramps $RAMP_0$, $RAMP_1$ the variation of $TON\_MSK_{TH}$ represents a percentage of the switching period. The comparator COMP as a result provides the turn-on delay $T_D$ of the turn-on signal GD1 of the transistor SR1. FIG. 11b shows a diagram of signals SC, $RAMP_{TON\_MSK}$, GD1 in play in the circuit of FIG. 10; when the voltage threshold value $TON\_MSK_{TH}$ increases for the half-cycle n and n+1 the turn-on delay $T_D$ increases in the same way.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control device, comprising:
a zero crossing detector configured to detect a zero crossing of a current flowing through a first transistor of a rectifier of a switching converter during each of plural switching cycles;
a first counter configured to count consecutive converter switching cycles to a number N;
a driver configured to generate a first turn-on signal that turns on the first transistor and to insert a turn-on delay in the turn-on signal equal to a first fixed quantity from a start time instant for each switching cycle, and start the first counter after the insertion of the turn-on delay in the first turn-on signal, wherein the driver is configured to:
verify cycle for cycle whether the zero crossing detector has detected a zero crossing of the current flowing through the first transistor after the turn-on of said first transistor,
decrease the turn-on delay by a second fixed quantity for a next switching cycle if no zero crossing of the current flowing through the first transistor is detected before said number N of consecutive switching cycles is counted by the counter;
restart the counter if no zero crossing of the current flowing through the first transistor is detected before said number N of consecutive switching cycles is counted by the counter;
maintain turned on said first transistor if the zero crossing of the current flowing through the first transistor is detected;
restart the counter if the zero crossing of the current flowing through the first transistor is detected;
increase the turn-on delay by the second fixed quantity for switching cycles following the switching cycle in which the zero crossing is detected if the turn-on delay of the first turn-on signal is smaller than the first fixed quantity; and
maintain the turn-on delay for the switching cycles following the switching cycle in which the zero crossing is detected if the turn-on delay of the first turn-on signal is equal to said first fixed quantity.

2. The control device of claim 1, comprising a second counter configured to count consecutive zero crossings of the current flowing through the first transistor when the turn-on delay is equal to the first fixed quantity, said driver being configured to turn off the first transistor if the counter reaches a number K.

3. The control device of claim 1, wherein the driver is configured to stop decreasing the turn-on delay if the turn-on delay of the first turn-on signal is equal to a minimum turn-on delay.

4. The control device of claim 1, wherein the first fixed quantity of the turn-on delay is a prefixed percentage of each switching cycle and is a maximum turn-on delay of the first turn-on signal.

5. The control device of claim 4, wherein the control device comprises a detector circuit configured to measure each switching cycle and determine said prefixed percentage of each switching cycle.

6. The control device of claim 1, wherein the second fixed quantity is a prefixed percentage of the switching cycle.

7. The control device of claim 6, wherein the control device comprises a detector circuit to measure the switching cycle and determine said prefixed percentage of the switching cycle.

8. The control device of claim 1, wherein said driver is configured to turn on the first transistor and a second transistor of the rectifier respectively during first and second half-cycles of the switching cycles using the first turn-on signal and a second turn-on signal, respectively, the turn-on delay being used for both the first and second turn-on signals of said transistors.

9. The control device of claim 1, further comprising a controlled delay circuit configured to provide said turn-on delay, the controlled delay circuit including:
a voltage signal generator configured to generate first and second ramp signals and a saw-tooth signal that corresponds to a sum of the first and second ramp signals;
a comparator configured to transmit to the driver circuit a turn-on delay signal, indicative of the turn-on delay, based on a comparison of the saw-tooth signal with a variable threshold that is based on the first and second ramp signals.

10. The control device of claim 9, wherein the voltage signal generator includes a current mirror that includes:
a first mirror leg that includes a current source configured to provide a mirror current;
a second mirror leg coupled to the first mirror leg and configured to produce the first ramp signal based on the mirror current;
a third mirror leg coupled to the first mirror leg and configured to produce the second ramp signal based on the mirror current; and
a fourth mirror leg coupled to the first mirror leg and configured to produce the sawtooth signal based on the mirror current.

11. A switching converter, comprising:
a rectifier that includes a first transistor; and
a control device configured to control the rectifier, the control device including:
a zero crossing detector configured to detect a zero crossing of a current flowing through the first transistor during each of plural switching cycles;
a first counter configured to count consecutive converter switching cycles to a number N;
a driver configured to generate a turn-on signal that turns on the first transistor and to insert a turn-on delay in the first turn-on signal equal to a first fixed quantity from a start time instant for each switching cycle, and start the first counter after the insertion of the turn-on delay in the first turn-on signal, wherein the driver is configured to:
verify cycle for cycle whether the zero crossing detector has detected a zero crossing of the current flowing through the first transistor after the turn-on of said first transistor,
decrease the turn-on delay by a second fixed quantity for a next switching cycle if no zero crossing of the current flowing through the first transistor is detected before said number N of consecutive switching cycles is counted by the counter;
restart the counter if no zero crossing of the current flowing through the first transistor is detected before said number N of consecutive switching cycles is counted by the counter;
maintain turned on said first transistor if the zero crossing of the current flowing through the first transistor is detected;
restart the counter if the zero crossing of the current flowing through the first transistor is detected;
increase the turn-on delay by the second fixed quantity for switching cycles following the switching cycle in which the zero crossing is detected if the turn-on delay of the first turn-on signal is smaller than the first fixed quantity; and
maintain the turn-on delay for the switching cycles following the switching cycle in which the zero crossing is detected if the turn-on delay of the first turn-on signal is equal to said first fixed quantity.

12. The switching converter of claim 11, wherein the control device includes a second counter configured to count consecutive zero crossings of the current flowing through the first transistor when the turn-on delay is equal to the first fixed quantity, said driver being configured to turn off the first transistor if the counter reaches a number K.

13. The switching converter of claim 11, wherein the driver is configured to stop decreasing the turn-on delay if the turn-on delay of the first turn-on signal is equal to a minimum turn-on delay.

14. The switching converter of claim 11, wherein said driver is configured to turn on the first transistor and a second transistor of the rectifier respectively during first and second half-cycles of the switching cycles using the first turn-on signal and a second turn-on signal, respectively, the turn-on delay being used for both the first and second turn-on signals of said transistors.

15. The switching converter of claim 11, wherein the control device includes a controlled delay circuit configured to provide said turn-on delay, the controlled delay circuit including:
a voltage signal generator configured to generate first and second ramp signals and a saw-tooth signal that corresponds to a sum of the first and second ramp signals;
a comparator configured to transmit to the driver circuit a turn-on delay signal, indicative of the turn-on delay, based on a comparison of the saw-tooth signal with a variable threshold that is based on the first and second ramp signals.

16. The switching converter of claim 15, wherein the voltage signal generator includes a current mirror that includes:
a first mirror leg that includes a current source configured to provide a mirror current;
a second mirror leg coupled to the first mirror leg and configured to produce the first ramp signal based on the mirror current;
a third mirror leg coupled to the first mirror leg and configured to produce the second ramp signal based on the mirror current; and a fourth mirror leg coupled to the first mirror leg and configured to produce the sawtooth signal based on the mirror current.

17. A method, comprising:

controlling a rectifier of a switching converter, the rectifier including a first transistor, the controlling including:

generating a first turn-on signal that turns on the first transistor;

inserting, in the first turn-on signal, a turn-on delay equal to a first fixed quantity from a start time instant of each switching cycle of a plurality of switching cycles;

starting a count of consecutive converter switching cycles, detecting, cycle for cycle whether a zero crossing has occurred of current flowing through the first transistor after the turn-on of said first transistor, and if no zero crossing of the current is detected until a given number N of consecutive switching cycles is counted, decreasing the turn-on delay by a second fixed quantity for the next switching cycles and restarting the count of said consecutive switching cycles, if a zero crossing of the current flowing through the first transistor is detected, maintaining turned on said first transistor and restarting the counting of said consecutive switching cycles, if the turn-on delay of the first turn-on signal is smaller than the first fixed quantity, increasing the turn-on delay by the second fixed quantity for the switching cycles following the switching cycle in which zero crossing is detected, and if the turn-on delay of the first turn-on signal is equal to said first fixed quantity, maintaining the turn-on delay for the switching cycles following the switching cycle in which the zero crossing is detected.

18. The method of claim 17, comprising:

if a number K of consecutive zero crossings of the current flowing through the first transistor are detected when the turn-on delay is equal to the first fixed quantity, turning-off the first transistor.

19. The method of claim 17, comprising:

if the turn-on delay of the first turn-on signal is equal to a given minimum turn-on delay, stopping decreasing the turn-on delay.

20. The method of claim 17, wherein the first fixed quantity is a prefixed percentage of each switching cycle and represents a maximum turn-on delay of the first turn-on signal.

21. The method of claim 17, wherein the second fixed quantity is prefixed percentage of the switching half-cycle.

22. The method of claim 17, comprising turning on the first transistor and a second transistor of the rectifier respectively during first and second half-cycles of the each switching cycle using the first turn-on signal and a second turn-on signal, respectively, the turn-on delay being used for both the first and second turn-on signals.

* * * * *